(12) United States Patent
Pang et al.

(10) Patent No.: US 6,493,837 B1
(45) Date of Patent: Dec. 10, 2002

(54) USING LOG BUFFERS TO TRACE AN EVENT IN A COMPUTER SYSTEM

(75) Inventors: Jee Fung Pang, Woodinville, WA (US); Bradley Michael Waters, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/354,840

(22) Filed: Jul. 16, 1999

(51) Int. Cl.⁷ .................................................. G06F 11/34
(52) U.S. Cl. ............................ 714/45; 714/18; 714/20; 707/202; 707/204
(58) Field of Search ................................. 707/202, 204, 707/203; 714/18, 20, 45

(56) References Cited

U.S. PATENT DOCUMENTS

| | | | | |
|---|---|---|---|---|
| 3,753,239 A | * | 8/1973 | Lindsey et al. | 711/156 |
| 5,513,112 A | * | 4/1996 | Herring et al. | 705/404 |
| 5,533,193 A | * | 7/1996 | Roscoe | 714/39 |
| 5,790,427 A | * | 8/1998 | Greer et al. | 607/27 |
| 5,872,909 A | * | 2/1999 | Wilner et al. | 714/38 |
| 6,101,504 A | * | 8/2000 | Gord | 705/400 |
| 6,182,086 B1 | * | 1/2001 | Lomet et al. | 707/202 |
| 6,347,335 B1 | * | 2/2002 | Shagam et al. | 709/223 |

OTHER PUBLICATIONS

Pang, Jee Fung. "Capacity Planning for Windows NT: Event Tracing and Instrumentation." Paper and PowerPoint demonstration. Late Breaking Paper, CMG '97 Conference, Orlando, FL (Dec. 7–12, 1997).

Pang, Jee Fung. "Performance Management and Capacity Planning Support in Windows 2000." PowerPoint demonstration. PDC '98 Conference, Denver, CO (Oct. 12–15, 1998).

Pang et al. "Understanding the Windows NT Disk I/O Subsystem." Paper and PowerPoint demonstration. CMG '98 Conference, Anaheim, CA (Dec. 6–11, 1998).

Raghuraman et al. "Network Performance Monitoring in Windows NT." Paper and PowerPoint demonstration. CMG '98 Conference, Anaheim, CA (Dec. 6–11, 1998).

* cited by examiner

*Primary Examiner*—B. James Peikari
(74) *Attorney, Agent, or Firm*—Leydig, Voit & Mayer, Ltd.

(57) ABSTRACT

An event tracing program generally receives performance data about an event occurring on the computer system from a data producer program. The event tracing program responds by recording the event performance data in one of a set of a log buffers. When a log buffer becomes full, the event tracing program places the log buffer on a buffer flush list. The filled buffer is then written out to a more permanent storage medium, such as a disk. From time to time, the event tracing program may also transfer a buffer to the flush list prior to becoming full after a time-out period. To prevent a buffer from being flushed while event performance data is being recorded in the buffer, a reference count is incremented prior to the record operation to signify that the buffer is currently being modified. For high performance on multiprocessor systems, the buffers are allocated per processor to minimize data sharing among processors.

28 Claims, 4 Drawing Sheets

USING LOG BUFFERS TO TRACE AN EVENT IN A COMPUTER SYSTEM

TECHNICAL FIELD

The invention relates generally to event tracing programs and, more particularly, to an event tracing program having per-processor log buffers.

BACKGROUND OF THE INVENTION

An information technology manager who makes purchasing decisions for an organization needs to have an idea about the load the organization's computer systems are expected to handle. A convenient way of obtaining this information is to track the performance of the system during periods of heavy use. One well known method of tracking system performance data is to use counters, which are stored values that get incremented every time a particular event occurs. For example, an operating system could provide one counter for keeping track of disk reads on a particular drive and another counter for keeping track of disk writes. If a system administrator wanted to know how many I/O operations occur during the day, he could obtain the counters through a program such as PERFORMANCE MONITOR, which is implemented on the MICROSOFT WINDOWS NT or WINDOWS 2000 brand operating systems, or through a published programming interface. On multiprocessor systems, counters are normally contained in globally accessible data structures and are therefore shared among several processors.

Event tracing is a technique often used in conjunction with counters to track system performance data by recording events of interest in a log buffer. For example, a read on disk number one can be recorded as "read #1." The total number of reads can then be tallied in a post-processing phase by analyzing the logged data. On multiprocessor systems, log buffers also tend to be global entities.

There are several disadvantages to using global data structures to track performance on a multiprocessor system. One problem is that when two or more processors simultaneously attempt to update a counter or log their respective events in a shared buffer, the data may become corrupted. A solution to this problem is to use a synchronization variable known as a "spin lock." For example, if two processors are both competing to write to a log buffer, the first processor to initiate the operation "locks" out the other processor by setting a spin lock variable to a "locked" state and raising the interrupt request level (IRQL) of the first processor. The other processor remains in a loop as long as it detects that the spin lock variable is "locked." After the first processor finishes recording an event in the log buffer, it sets the spin lock to an "unlocked" state and lowers the IRQL, thus allowing the other processor to log an event. But using a spin lock causes some processors to waste time waiting for the spin lock to be released. Also, an IRQL change is both time consuming and cannot be easily and efficiently implemented in user mode.

Another problem with using global data structures to track performance data on a multiprocessor system is that when the data is in cache and two or more processors are attempting to manipulate the data, there is a chance that one processor may flush the cache before a second processor has finished its modification. The second processor would then be required to retrieve the block containing the performance data from slower main memory in order to complete the modification.

Reserving separate memory blocks for each processor and storing performance data locally is a more effective way to accomplish event tracing in multiprocessing systems than using global data. Dedicating each active buffer to a single processor allows each processor to log events to its respective buffer independently of other processors, thereby eliminating the need for a synchronization mechanism.

When a processor's log buffer fills up, the buffer may need to undergo a process known as "flushing," in which the contents of the buffer are written to a more permanent location, such as a disk file, so that the buffer can be reused. However, the processor may experience a context switch while the event tracing program is recording the event data in the buffer, and the buffer may get flushed in the new context before the event data is completely recorded. To prevent a context switch from occurring, it is conventional to raise the processor's IRQL during the data log write operation. However, on many processors, raising the IRQL requires a large number of cycles, thus making this solution impractical or unacceptable in terms of performance overhead. Furthermore, if event logging takes place in the processor's user mode (as opposed to the kernel mode), this solution is unworkable, since the IRQL generally cannot be changed from the user mode. Thus, there is a need for a method of recording events in a buffer that maintains the integrity of the buffer data during context switches.

SUMMARY OF THE INVENTION

The invention is generally realized as an event tracing program. The event tracing program generally receives performance data about an event occurring on the computer system from a data producer program. The event tracing program responds by recording the event performance data in one of a set of a log buffers. When a log buffer becomes full, the event tracing program places the log buffer on a flush list. The contents of each buffer on the flush list are eventually written out to a more permanent storage location, such as to a log file on a disk, and the buffer itself is transferred to the free list for reuse. To prevent a buffer from being flushed event performance data is being recorded in it, a reference count is incremented prior to the recording process to signify that the buffer is currently being modified.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
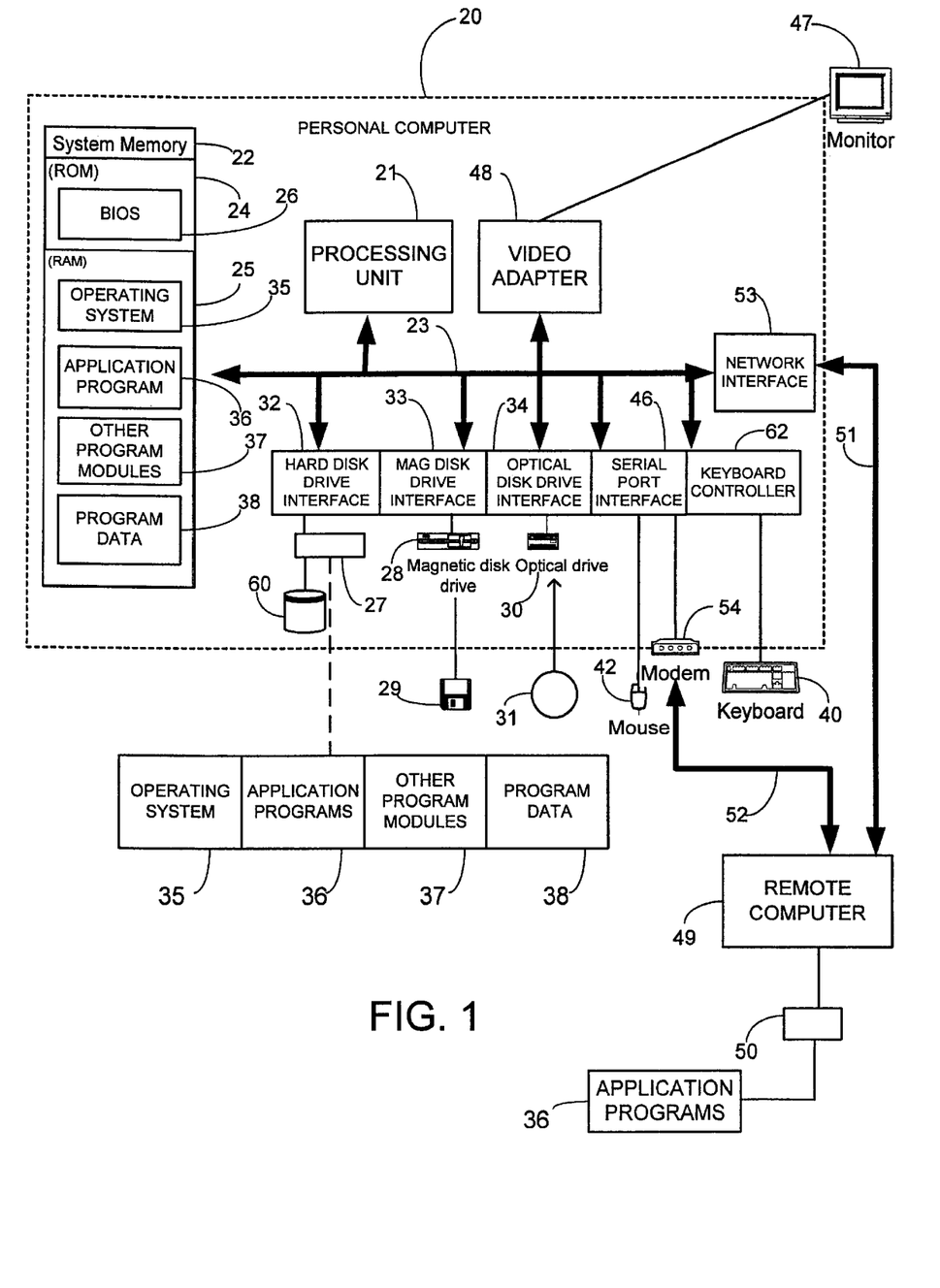
FIG. 1 is a block diagram illustrating an exemplary LAN or WAN computer system on which the present invention can reside.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in the ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40, which is typically connected to the personal computer 20 via a keyboard controller 62, and a pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1.

The logical connections depicted in FIG. 1 include a local area network (LAN) 51 and a wide area network (WAN) 52. Such networking environments are commonplace in offices, enterprise-wide computer networks, intranets and the Internet. It will be appreciated that the network connections shown are exemplary and other means of establishing a communications link between the computers may be used. When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device 50.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
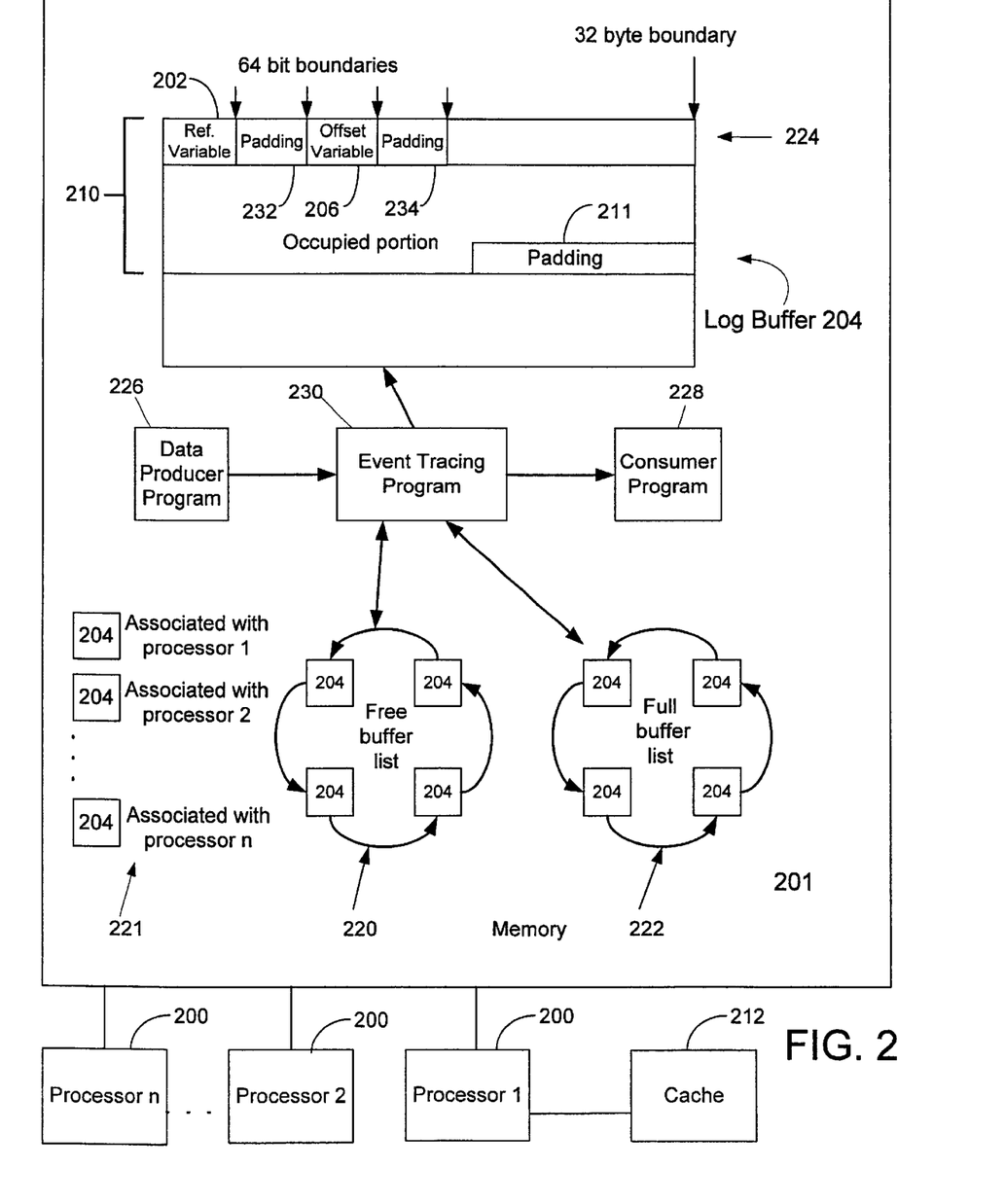
FIG. 2 is a block diagram showing a preferred embodiment of the invention.

The invention is generally realized as an event tracing program. Referring to FIG. 2, a preferred embodiment of an event tracing program 230 is depicted as being stored in a memory 201 accessible by one or more processors 200. The memory 201 may be RAM, ROM disk, or any other computer storage medium or combination of storage media and is generally considered to be a main memory. While the event tracing program 230 may initially be stored in the memory 201, it may be loaded into a cache 212, either in total or in part, as needed. While only one cache 212 is depicted, it is understood that each processor 200 may have it own dedicated cache, or dedicated portion of a shared cache.

The event tracing program 230 generally receives performance data about an event occurring on a computer system from a data producer program 226 which executes a calling thread on one of the processors 200 to request that event performance data be logged by the event tracing program 230. The data producer program 226 can be any application that owns the source of the event data. An example of a kernel-mode data producer program is an operating system, which would be able to detect when disk drives were accessed, when a user logon occurred, and the like. An example of a user-mode data producer is the MICROSOFT brand INTERNET INFORMATION SERVER, which can detect internet accesses, downloads, etc. The event tracing program 230 responds by recording the event performance data in one of a set of a log buffers 204. Preferably, each log buffer 204 is initially referenced in a list 220 of free log buffers until it becomes associated with one of the processors 200. Those log buffers 204 that are associated with a processor are generally shown in FIG. 2 to be members of a set 221 of associated buffers. When a log buffer 204 in the set 221 becomes full, the event tracing program 230 removes the association between the log buffer 204 and its respective processor and places the log buffer 204 on a flush list 222. Preferably, each buffer on the flush list 222 is asynchronously written out to a more permanent storage medium, such as a disk, and returned to the list 220 during the execution of a maintenance thread by the event tracing program 230. The flushing procedure may also be performed synchronously. As will be described below in more detail, the event tracing program 230 may also remove the association between a log buffer in the set 221 and its respective processor and transfer the log buffer to the flush list 222 after a certain time period elapses in which the log buffer has not been used, even if the log buffer is not full.

The event tracing program 230 provides performance data to a consumer program 228, which can use the performance data in a variety of ways. The consumer program 228 may in turn provide the performance data or an analysis of it to a user via a graphical user interface. An example of a data consumer program is the PERFORMANCE MONITOR implemented on the MICROSOFT WINDOWS NT brand operating system. While they are depicted as separate programs in FIG. 2, the data producer program 226, the event tracing program 230 and the consumer program 228 may all be implemented as a single program.

Figure 3:
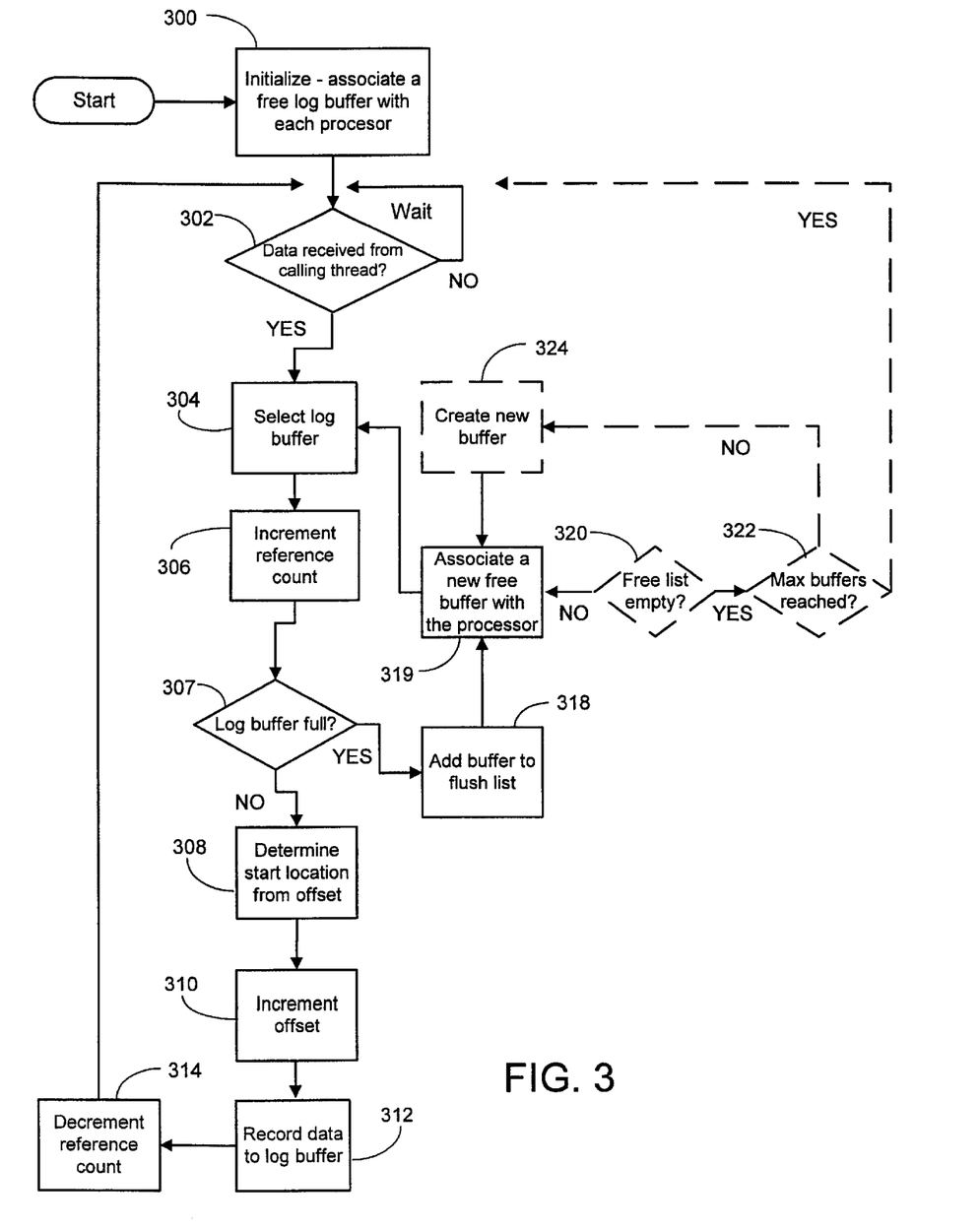
FIG. 3 is a flowchart generally depicting the flow of control of a preferred embodiment of the event tracing program.

Referring to the flowchart of FIG. 3, the event tracing program initializes upon start up at step 300 by enumerating the available processors 200 and associating a log buffer 204 from the free list 220 with each processor 200. The act of associating a log buffer with a processor 200 can be accomplished by removing a pointer to the log buffer from the list 220 and passing the pointer to the processor 200.

To log an event to a log buffer, the data producer program 226 first passes the event performance data to the event tracing program 230 at step 302. This data may be obtained from a contiguous memory location by the data producer program 226 prior to being passed to the event tracing program 230, or different components of the data may be stored on separate memory locations. In the latter case, the data producer program 226 will pass an array containing a pointer to and size of each component of the data (e.g. one pointer for the transaction type and another for the destination device), so that the data may be recorded in the log buffer 204 without the data producer program 226 being required to consolidate the different components into one contiguous location.

The event tracing program 230 selects a log buffer 204 from the set 221 of associated buffers at step 304. To help insure cache locality, it is preferred that the log buffer 204 associated with the calling thread's processor be selected. At step 306, the event tracing program 230 increments a reference count variable 202. The reference count variable 202 represents the number of threads that are currently using the log buffer 204 to record event data. At step 307, the event tracing program 230 will determine whether the log buffer 204 is full by comparing an offset variable 206 with a predetermined buffer size. The offset variable 206 represents the ending location of an occupied portion 208 of the buffer 204. If the offset variable 206 is greater than the size of the log buffer 204, the event tracing program 230 will add the log buffer 204 to the flush list 222, preferably by using an atomic operation, such as the interlock exchange operation of the WINDOWS 2000 brand operating system, at step 318. The flow of control then proceeds to step 319, in which the event tracing program removes one of the free buffers from the list 220 and associates it with the processor that just gave up a full log buffer. After step 319, the flow returns to step 304.

When adding the log buffer 204 to the flush list 222, it may be necessary for the event tracing program 230 to update list maintenance information for the log buffer 204. To allow the list maintenance information to be updated in the consumer program 228's context, it is preferable to store the list information in the log buffer itself, such as in a header 224 as shown in FIG. 2. The header 224 may also contain the reference count variable 202 and the offset variable 206 as described below. It is also preferred that the header 224 be sized and memory aligned to fit into a single line of cache (such as a 32 byte block shown in FIG. 2), so that only one read is required to bring it from main memory into the cache.

If the log buffer 204 is not full, the event tracing program 230 will determine the location at which to start writing the log entry by examining the current offset value represented by the offset variable 206 at step 308. At step 310, the event tracing program 230 will then increment the offset variable 206 by at least the number of bytes required for the log entry, thereby reserving a memory block 210 for storing the log entry in the log buffer 204. It is preferred that the occupied portion 208 of the reserved memory block 210 be aligned to match the register size of the processor 200. In other words, if the processor 200 is a 64 bit processor, then the occupied portion 208 should be 64 bit aligned in order to minimize the number of cycles required to access the data in the occupied portion 208.

In an alternative embodiment, the reserved memory block 210 may be further sized and aligned to correspond with the cache line size of the cache 212. For example, if each line of the cache 212 is 32 bytes and the data producer program 226 requires 24 bytes of memory for logging, then the event tracing program 230 aligns the reserved memory block 210 along a 32 byte boundary and expands the 24 byte block out to 32 bytes by using a padding block 211. This ensures all data in the buffer 204 can be brought into the cache 212 using the minimum number of reads. The event tracing program 230 will then record the performance data into the reserved memory block 210 at step 312. The performance data is generally depicted in FIG. 2 to be in the occupied portion 208 of the reserved memory block 210 and may include such performance characteristics as transaction type (I/O read, write, exception, etc.), source device, and destination device. At step 314, the event tracing program 230 decrements the reference count variable 202. Preferably, the increment and decrement operations of steps 306, 310 and 314 are performed atomically, such as by using an interlock operation of the WINDOWS 2000 brand operating system. Performing these operations atomically prevents the reference count and the offset count from becoming corrupted as a result of a context switch or execution concurrency occurring during an increment or decrement.

To maintain the free list 220 and the flush list 222, the event tracing program 230 runs a maintenance thread to flush the log buffers on the flush list 222 so that the log buffers can then be returned to the free list 220. However, if the reference count variable 202 of a log buffer on the list 222 is not at its original baseline value, (thereby indicating that at least one logging thread is has not completed recording data in it), then the maintenance thread will not flush that buffer. This eliminates the risk that an incomplete performance data entry to the processor's log will be flushed in the event that the processor is forced to change context while the event tracing program 230 is in the process of event logging.

Figure 4A:
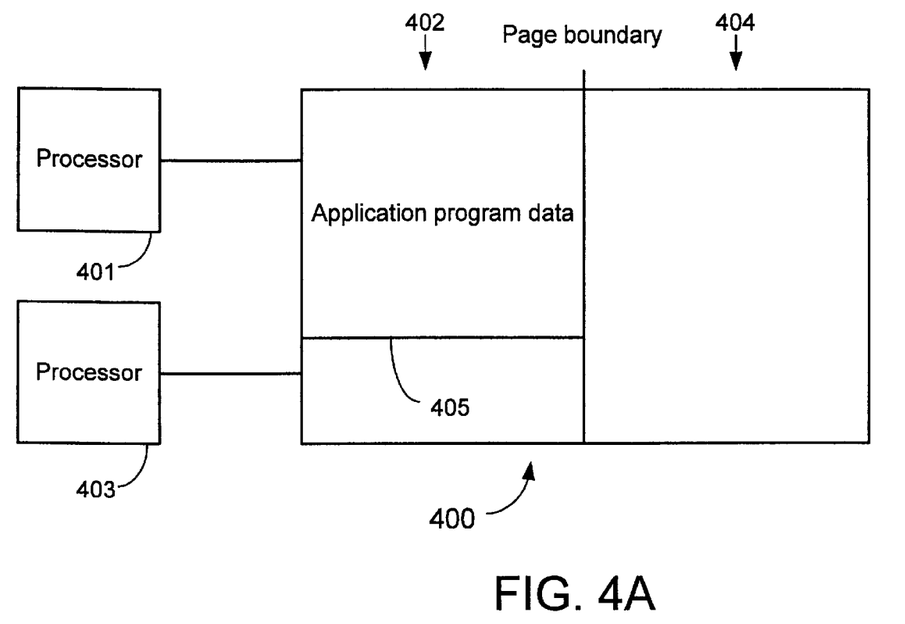
FIGS. 4A and 4B are block diagrams illustrating memory fragmentation.
Figure 4B:
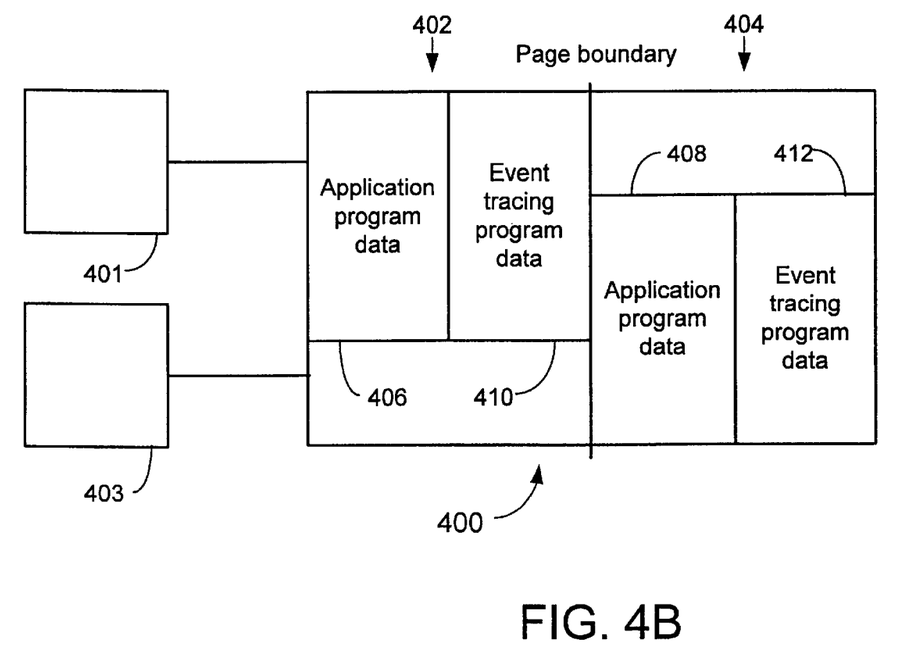

Event tracing preferably has no permanent impact on other executing programs. One residual effect caused by previous event tracing schemes is memory fragmentation, in which blocks of data become fragmented into several smaller blocks which get stored on different pages of memory. For example, referring to FIG. 4A, a memory 400 is shared between two processors 401 and 403, and contains two pages of usable storage space. An application program running on the processor 401 uses a single contiguous memory block 405 which fits on the page 402. When an event tracing program begins to execute on the processor 403, both programs will attempt write to the memory 400 simultaneously, searching for the first available locations. As a result, their respective program data may get fragmented into blocks 406 and 408 (for the application program) and blocks 410 and 412 (for the event tracing program) as shown in FIG. 4B. This will tend to slow down the execution of the application program, since two pages of memory will have to be loaded into cache in order to have quick access to the application program data instead of one. Once the event tracing program terminates, the memory blocks 410 and 412 will be available for use by the application program, but the execution speed of the application program will not return immediately to its original level since its program data will remain fragmented across two pages of memory. Moreover, both pages of memory will still be required for the application program to execute even though the event tracing program has terminated.

In order to prevent the memory 201 from becoming fragmented as a result of the its use by the event tracing program 230, the reference count variable 202 and the offset variable 206 are preferably stored within the same data structure. Since these two variables tend to be accessed closely in time with one another, it is also preferred that they be accessible within a single read from main memory into cache. To ensure such access, the count variable and the offset variable may be placed on the same cache line within the log buffer 204. This also ensures that they remain on the same page of memory, thus preventing the data of other programs from becoming fragmented as a result of these variables being written out to the memory. Thus, if the cache 212 of the processor 200 holds data in lines of 32 bytes (or a multiple thereof), then reference count variable 202 and the offset variable 206 should be located within a single 32 byte line.

To further speed up access to the reference count variable 202 and the offset variable 206, it preferable to store each of the variables along boundaries that match the register size of the processor 201. For example, if the processor 201 is a 64 bit processor, then the reference count variable 202 and the offset variable 206 may each be stored in a 32 bit block. Blocks 232 and 234, which are also 32 bit, may be used as padding. This exemplary storage scheme ensures that only one read is required to access each of the variables.

The event tracing program 230 may also reduce or expand the amount of memory it uses for logging events by adjusting the number of log buffers to fit the program's actual needs. This keeps the amount of overhead required for the event tracing program to a minimum. In order to increase the number of buffers used, a event tracing program 230 may execute the steps 320–324 which are shown with dashed lines in FIG. 3, and may be executed in sequence with steps 300–319 described above. At step 320, the event tracing program 230 determines whether the list 220 of free buffers is empty. If the list is not empty, the flow of control continues at step 319. If the list 220 is empty, then the event tracing program 230 calculates the amount of memory currently being used by all of the processors 200 to log events and compares that amount with a predetermined maximum at step 322. If the amount is less than the maximum, then the event tracing program allocates memory for a new log buffer 204 at step 324 and adds the new log buffer 204 to the list 220 of free buffers. If the amount of memory being used by the buffers is equal to or exceeds the maximum, then the event tracing program returns to step 302.

To identify unnecessary buffers, a time stamp may be included in the header block 224. The time stamp may be updated by the event tracing program 230 whenever the log buffer is flushed. By periodically examining the time stamp of a log buffer currently contained in the list 220 of free buffers, the event tracing program 230 determines how much time has elapsed since the log buffer was last used. If a log buffer has not been used for a predetermined time period, the log event tracing program 230 frees up that log buffer for use by other programs. The log event tracing program 230 may also pre-designate a minimum number of available log buffers. In such a case, a log buffer's memory would not be freed up if doing so would bring the total number of log buffers below the minimum.

The event tracing program 230 may be implemented in either user mode or in kernel mode of the processor 200, but it preferably executes in the same mode as the data provided program 226 to avoid any delays caused by switching between kernel and user modes. One distinction between running the event tracing program in user mode and running it in kernel mode is that knowledge of the individual processors in a multiprocessor system is generally hidden from user mode programs. Thus, when running the event tracing program 230 in user mode, the event tracing program 230 may execute on a different processor than the consumer program 228. This may slow down the execution of the event tracing program 230, since the new processor is less likely to have any of the event data of the data provider program 226 in its cache. However, it may still be advantageous for a user mode data provided program 226 to invoke a user mode event tracing program 230 since the time required for switching to kernel mode may be greater than the delay caused accessing data that was in the cache of another processor in user mode. When implemented on the MICROSOFT WINDOWS 2000 or WINDOWS NT brand operating systems, a user mode thread is biased to run on the "ideal processor," which may or may not be the same processor as the processor on which the thread is currently running. The event tracing program partitions data by processor using the ideal processor of the thread. Since the WINDOWS 2000 and WINDOWS NT brand operating systems attempt to run a thread on the ideal processor assigned to the thread, the ideal processor is a good hint as to what processor the thread is running on. The effectiveness of ideal processor hint varies by the applications and workloads running on the computer system.

In view of the many possible embodiments to which the principals of this invention may be applied, it should be recognized that the embodiment described herein with respect to the drawing figures is meant to be illustrative only and should not be taken as limiting the scope of the invention. It should also be recognized that the ordering and the specific implementation of the program steps described above and depicted in the flowchart of FIG. 3 may be altered in certain respects. For example, the reference count is currently described as being incremented during a log buffer record operation and then decremented upon completion, but it could easily be decremented during a record and incremented upon completion. The event tracing program could recognize that any difference between the value of the reference count and its original baseline value indicates that the log buffer is being updated.

Furthermore, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of tracing an event on a computer system comprising the steps of: reserving a log buffer; changing a reference variable in the log buffer from a first value to a second value; recording data descriptive of the event in the log buffer; and changing the reference variable from the second value to the first value to indicate that the recording step is complete, wherein the reference variable is usable to determine whether the log buffer may be flushed.

2. The method according to claim 1, the computer system having a memory and a plurality of processors, further comprising the steps of: receiving data descriptive of an event from a program running on one of the processors; and associating the log buffer with the processor.

3. The method according to claim 1, further comprising the steps of: determining whether the log buffer is full; determining whether the reference variable is equal to a baseline value; and if the log buffer is full and the reference variable is equal to the baseline value, flushing the log buffer.

4. The method according to claim 3, further comprising the steps of: moving the log buffer from a flush list to a free buffer list using an interlock exchange.

5. The method according to claim 1, further comprising the steps of: determining whether the log buffer is full; and if the log buffer is full, adding the log buffer to a flush list.

6. The method according to claim 1, further comprising the steps of: examining an offset variable in the log buffer to determine the starting location to be used for the recording step; and incrementing the offset variable.

7. The method according to claim 6, further comprising the step of storing the reference variable and the offset variable in the same data structure.

8. The method according to claim 6, further comprising the step of cache aligning the reference variable and the offset variable.

9. The method according to claim 6, wherein the computer system has a memory, the processor has a register, further comprising the step of aligning the reference and offset variables in the memory according to the size of the register.

10. The method according to claim 1, further comprising the step of cache aligning the descriptive data.

11. The method according to claim 1, wherein the computer system has a memory, the processor has a register, further comprising the step of aligning the descriptive data in the memory according to the size of the register.

12. The method according to claim 1, the computer system having a memory, a plurality of processors, the processors having associated log buffers, further comprising the steps of: determining whether a free buffer list is empty; determining the amount of the memory being occupied by the associated log buffers; and if the free buffer list is empty and the amount of memory being occupied by the associated log buffers is less than a predetermined maximum, designating an additional block of the memory to be a log buffer.

13. The method according to claim 1, the computer system having a memory and a plurality of processors, further comprising the steps of: receiving data descriptive of an event from a program running on one of the processors; and associating the log buffer with an ideal processor, wherein the ideal processor provides a hint as to the processor on which the program is running.

14. A computer-readable medium having computer-executable instructions for performing steps comprising: reserving a log buffer; changing a reference variable in the log buffer from a first value to a second value; recording data descriptive of the event in the log buffer; and decreasing the value in the reference variable by one to indicate that the recording step is complete, wherein the reference variable is usable to determine whether the log buffer may be flushed.

15. The computer-readable medium of claim 14, having further computer-executable instructions for performing steps comprising: receiving data descriptive of an event from a program running on one of a plurality of processors; and associating the log buffer with the processor.

16. The computer-readable medium of claim 14 having further computer-executable instructions for performing steps comprising: determining whether the log buffer is full; determining whether the reference variable equals a baseline value; and if the log buffer is full and the reference variable equals the baseline value, flushing the log buffer.

17. The computer-readable medium of claim 16 having further computer-executable instructions for performing steps comprising: moving the log buffer from a flush list to a free list using an interlock exchange.

18. The computer-readable medium of claim 14 having further computer-executable instructions for performing steps comprising: determining whether the log buffer is full; if the log buffer is full, adding the log buffer to a flush list.

19. The computer-readable medium of claim 14 having further computer-executable instructions for performing steps comprising: examining an offset variable in the buffer to determine the starting location to be used for the recording step; and incrementing the offset variable.

20. The computer-readable medium of claim 19, wherein the reference variable and the offset variable are stored in the same data structure.

21. The computer-readable medium of claim 19, wherein the reference variable and the offset variable are cache aligned.

22. The computer-readable medium of claim 19, having further computer-executable instructions for performing step of aligning the reference and offset variables in a memory according to the size of a processor register.

23. The computer-readable medium of claim 14, wherein the descriptive data is cache aligned.

24. The computer-readable medium of claim 14 having further computer-executable instructions for performing step of aligning the descriptive data in a memory according to the size of a processor register.

25. The computer-readable medium of claim 14 having further computer-executable instructions for performing steps comprising: determining whether a free buffer list is empty; determining the amount of a memory being occupied by log buffers associated with a plurality of processors; and if the free buffer list is empty and the amount of memory being occupied by the associated log buffers is less than a predetermined maximum, designating an additional block of the memory to be a log buffer.

26. The computer-readable medium of claim 14 having further computer-executable instructions for performing steps comprising: receiving data descriptive of an event from a program running on one of a plurality of processors; and associating the log buffer with an ideal processor, wherein the ideal processor provides a hint as to the processor on which the program is running.

27. A computer-readable medium having stored thereon a data structure, comprising: a log buffer for recording the occurrence of an event on a computer system; and a reference count variable located within in the log buffer, wherein the reference count variable has a base value and wherein a difference between the value of the reference count variable and the base value indicates whether the log buffer is being updated by one or more programs.

28. The computer-readable medium of claim 27, wherein the data structure further comprises: a first list containing references to a set of free log buffers; and a second list containing references to a set of full log buffers; wherein when one of the set of full log buffers is flushed, its associated reference is transferred to the first list.

\* \* \* \* \*